(12) United States Patent
Yang et al.

(10) Patent No.: US 11,019,528 B2
(45) Date of Patent: May 25, 2021

(54) METHOD AND SYSTEM FOR ADMISSION CONTROL WITH NETWORK SLICE CAPABILITY

(71) Applicant: Verizon Patent and Licensing Inc., Arlington, VA (US)

(72) Inventors: Jin Yang, Orinda, CA (US); Arda Aksu, Lafayette, CA (US); Lalit R. Kotecha, San Ramon, CA (US); Yee Sin Chan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 138 days.

(21) Appl. No.: 16/173,311

(22) Filed: Oct. 29, 2018

(65) Prior Publication Data

US 2020/0137621 A1 Apr. 30, 2020

(51) Int. Cl.
| | |
|---|---|
| *H04W 28/02* | (2009.01) |
| *H04W 48/18* | (2009.01) |
| *H04W 4/70* | (2018.01) |
| *H04W 76/27* | (2018.01) |
| *H04W 60/00* | (2009.01) |
| *H04W 48/16* | (2009.01) |

(52) U.S. Cl.
CPC ......... *H04W 28/0289* (2013.01); *H04W 4/70* (2018.02); *H04W 48/16* (2013.01); *H04W 48/18* (2013.01); *H04W 60/00* (2013.01); *H04W 76/27* (2018.02)

(58) Field of Classification Search
CPC ..... H04W 48/16; H04W 48/18; H04W 76/27; H04W 28/0289
See application file for complete search history.

(56) References Cited

U.S. PATENT DOCUMENTS

| | | | |
|---|---|---|---|
| 2017/0142591 A1* | 5/2017 | Vrzic | H04L 47/2408 |
| 2019/0014530 A1* | 1/2019 | Aghili | H04W 48/08 |
| 2019/0029075 A1* | 1/2019 | Wang | H04L 63/0876 |
| 2019/0037409 A1* | 1/2019 | Wang | H04W 16/04 |
| 2019/0159015 A1* | 5/2019 | Qiao | H04W 8/14 |
| 2020/0022193 A1* | 1/2020 | Ma | H04W 4/06 |
| 2020/0120580 A1* | 4/2020 | Jin | H04W 48/02 |

* cited by examiner

*Primary Examiner* — Redentor Pasia

(57) ABSTRACT

Systems and methods enable a wireless station in a radio access network to apply slice-based admission control. A wireless station receives, from a core network, network slice data for each network slice available via the wireless station, wherein the network slice data includes a slice identifier and corresponding slice status for each network slice; and receives, from a user equipment (UE) device, a service request that indicates a network slice identifier previously assigned to the UE device. The wireless station applies, based on the network slice data from the core network and the network slice identifier from the UE device, admission controls to forward the service request to the core network when the one of the network slices, corresponding to the network slice identifier, is not congested, and delay or redirect the service request when the one of the network slices, corresponding to the network slice identifier, is congested.

20 Claims, 8 Drawing Sheets

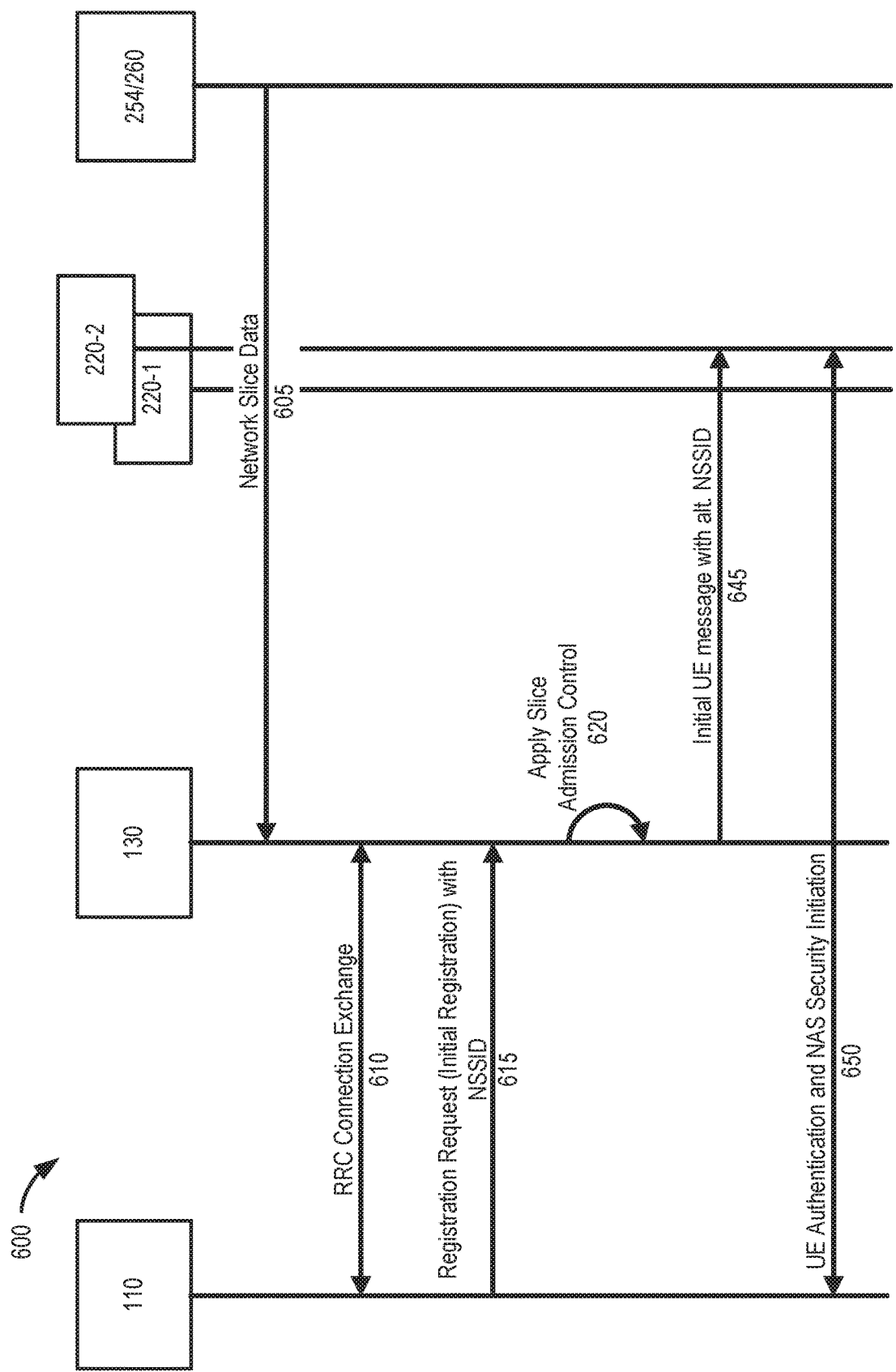

METHOD AND SYSTEM FOR ADMISSION CONTROL WITH NETWORK SLICE CAPABILITY

BACKGROUND

Fifth Generation (5G) networks may use different frequencies, different radio access technologies, and different core network functions that can provide an improved experience over legacy wireless networks (e.g., 4G networks). Optimal uses of new features available through 5G networks continue to be explored.

BRIEF DESCRIPTION OF THE DRAWINGS

FIGS. 6A and 6B are signal flow diagrams illustrating exemplary communications among devices in a portion of the network environment of FIG. 2.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Using network slicing, a physical network may be sectioned (or "sliced") into multiple, virtual, end-to-end networks. Each network slice may be dedicated for different types of services with different characteristics and requirements (e.g., latency, voice, jitter, bandwidth, pricing, etc.). As used herein, the term "slice" or "network slice" refers to a complete logical network including a Radio Access Network (RAN) and Core Network that provides certain telecommunication services and network capabilities that can vary from slice to slice. Selection of network slices can, thus, have significant impact on network performance and user experience.

In some instances, user equipment (UE, also referred to herein as a UE device) may be configured to use a particular network slice upon connection to a network (e.g., a 5G network). For example, an Internet-of-Things (IoT) device may be designated with a particular slice ID that matches network slice characteristics to the type of traffic generated by the IoT device. When applying current 5G network standards, the network does not apply admission controls to the network at the RAN wireless station (e.g., a gNodeB). That is, a UE device may be blocked or be delayed from network access, but no intelligent access decisions are made based on, for example, the UE device type and designated network slice.

Systems and methods described herein provide admission control capability, at wireless stations in a RAN, for UE devices that have been pre-configured for network slice selection at attachment. A wireless station for a RAN may implement logic to identify a default network slice selection, a UE device type, available slice resources, and control RAN access per network slice. The wireless station may determine whether to admit the UE device, block the UE device, delay attachment by the UE device, or redirect the UE device to a different network slice. In some implementations, slice-based admission control may be implemented in place of or in conjunction with access class barring or other barring and congestion-management techniques.

Figure 1:
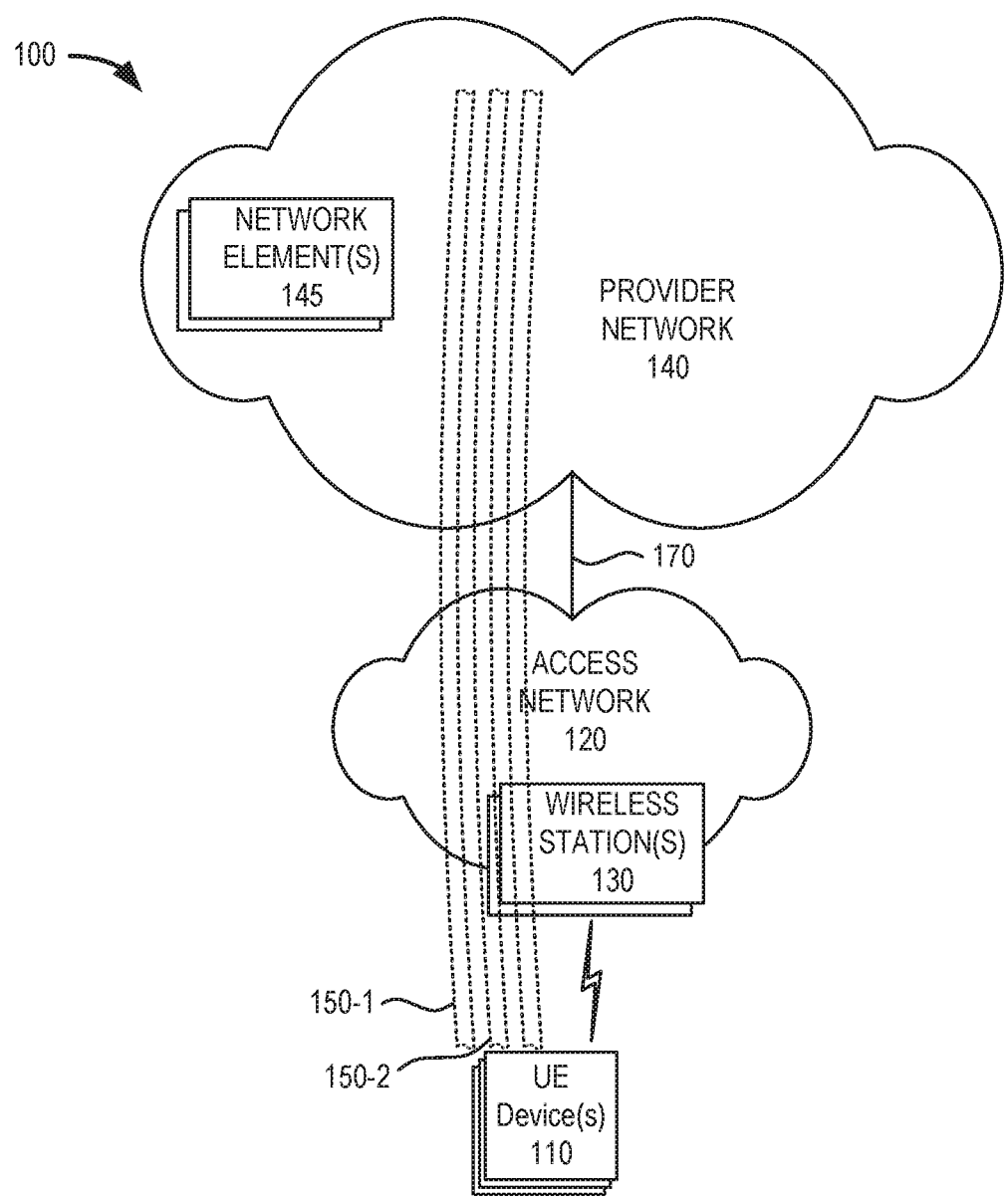
FIG. 1 is a diagram illustrating an environment according to an implementation described herein.

FIG. 1 is a diagram illustrating concepts described herein. As shown in FIG. 1, an environment 100 may include one or more UE devices 110, an access network 120, one or more wireless stations 130, and a provider network 140. Each UE device 110 may connect to access provider network 140 via access network 120 using one of multiple available network slices 150 (e.g., slice 150-1, 150-2, etc.).

UE device 110 may include a wireless machine-type communications (MTC) device that communicates wirelessly with other devices over a machine-to-machine (M2M) interface; a handheld wireless communication device; a wearable computer device (e.g., a head-mounted display computer device, a head-mounted camera device, a wristwatch computer device, etc.); a global positioning system (GPS) device; a media playing device; a portable gaming system; a laptop, tablet, or another type of portable computer; a smartphone; and/or any other type of computer device with wireless communication capabilities. UE device 110 may be used for voice communication, mobile broadband services (e.g., video streaming, real-time gaming, premium Internet access etc.), best-effort data traffic, and/or other types of applications.

According to exemplary implementations described herein, UE device 110 may be configured to use one or more applications or services that are optimally supported by a specific type of network slice 150. For example, UE device 110 may be provisioned with a network slice selection identifier (NSSID) that can be provided by the UE during an initial registration procedure. The NSSID may indicate, for example, a particular network slice that is optimally configured for a type of traffic initiated/required by UE device 110, traffic such as massive IoT data, video streaming, designated emergency data, etc.

Access network 120 may provide access to provider network 140 for wireless devices, such as UE device 110. Access network 120 may enable UE device 110 to connect to provider network 140 for Internet access, non-IP data delivery, cloud computing, mobile telephone service, Short Message Service (SMS) message service, Multimedia Message Service (MMS) message service, and/or other types of data services. Access network 120 may include wireless stations 130, and UE devices 110 may wirelessly communicate with access network 120 via wireless station 130. Access network 120 may establish a packet data network connection between UE device 110 and provider network 140 via one or more Access Point Names (APNs). For example, wireless access network 120 may establish an Internet Protocol (IP) connection between UE device 110 and provider network 140. In another implementation, access network may provide access to a service or application layer network, a cloud network, a multi-access edge computing (MEC) network, a fog network, and so forth. Furthermore, access network 120 may enable a server device to exchange data with UE device 110 using a non-IP data delivery method such as Data over Non-Access Stratum (DoNAS).

Access network 120 may include a 5G access network or another advanced network that supports network slicing. Additionally access network may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device that includes one or more devices (e.g., wireless transceivers) and other components and functionality that allow UE device 110 to wirelessly connect to access network 120. Wireless station 130 may correspond to a macrocell or to a small cell (e.g., a femtocell, a picocell, a microcell, etc.). In other implementations, wireless station 130 may include another type of base station for another type of wireless network that supports network slicing. Wireless station 130 may include or be associated with one or more network slices 150. According to implementations described herein, wireless station 130 may apply slice-based admission controls. Wireless stations 130 may connect to provider network 140 via backhaul links 170.

Provider network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE device 110, and may interface with other external networks, such as private IP networks.

According to one implementation, provider network 140 may include a core network for one or multiple access networks 120. For example, provider network 140 may include the core part of a 5G New Radio network, etc. Depending on the implementation, provider network 140 may include various network elements 145, such as a gateway, a support node, a serving node, a router, a switch, a bridge, as well as other network elements pertaining to various network-related functions, such as billing, security, authentication and authorization, network polices, subscriber profiles, etc. In some implementations, provider network 140 may include an Internet Protocol Multimedia Sub-system (IMS) network (not shown in FIG. 1). An IMS network may include a network for delivering IP multimedia services and may provide media flows between UE device 110 and external IP networks (not shown in FIG. 1).

Network slices 150 may be configured with different characteristics to support different types of applications and/or services, such as video streaming, massive Internet-of-Things (IoT) traffic, autonomous driving, etc. According to implementations described herein, UE device 110 may be configured with a default network slice 150 that may be structured for the type of network traffic initiated by UE device 110 (e.g., with particular characteristics for latency, bandwidth, jitter, etc.). According to implementations described further herein, each wireless station 130 may store in memory (e.g., locally or remotely) a table of available network slices supported through the wireless station 130 with current status for each network slice. Wireless station 130 may apply admission controls to incoming service requests to admit, block, delay or redirect the requesting UE device depending on slice congestion levels and other factors.

Although FIG. 1 shows exemplary components of environment 100, in other implementations, environment 100 may include fewer components, different components, differently arranged components, or additional functional components than depicted in FIG. 1. For example, in one implementation, environment 100 may include an MEC network that provides applications and services at the edge of a network, such as provider network 140.

Additionally or alternatively, one or more components of environment 100 may perform functions described as being performed by one or more other components of environment 100.

Figure 2:
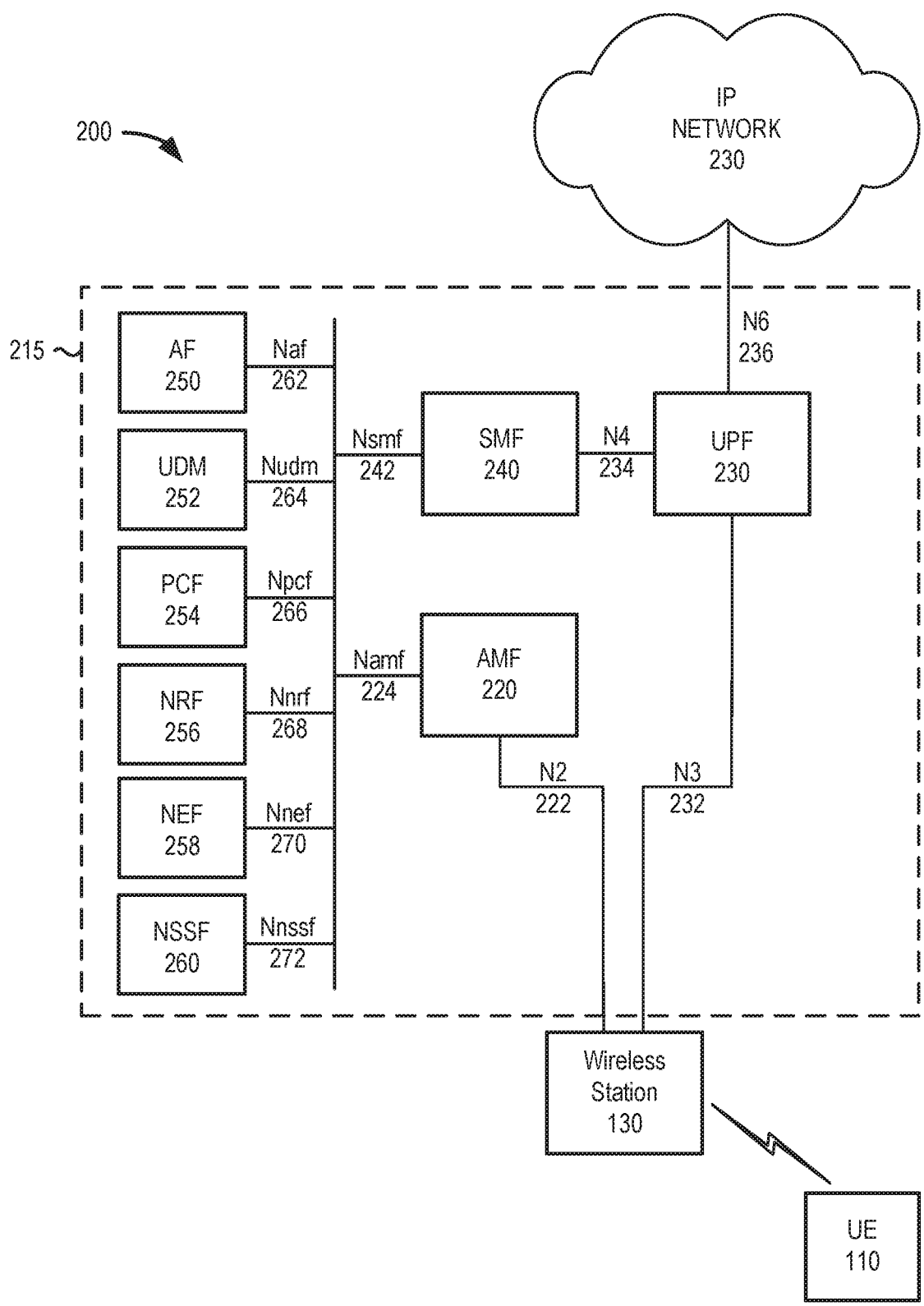
FIG. 2 is a diagram of a network environment illustrating exemplary components of the environment of FIG. 1.

FIG. 2 is a diagram illustrating a network environment 200 that includes exemplary components of environment 100 according to an implementation described herein. As shown in FIG. 2, network environment 200 may include UE device 110, wireless station 130, a core network 215, and an IP network 230. Core network 215 and IP network 230 may correspond to, or be included in, provider network 140.

Core network 215 may include an Access and Mobility Management Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Network Slice Selection Function (NSSF) 260. AMF 220, UPF 230, SMF 240, AF 250, UDM 252, PCF 254, NRF 256, NEF 258, and NSSF 260 may correspond to network elements 145 of FIG. 1 and may each be implemented as separate network devices or as nodes shared among one or more network devices. While FIG. 2 depicts a single AMF 220, UPF 230, SMF 240, AF 250, UDM 252, PCF 254, NRF 256, NEF 258, and NSSF 260 for illustration purposes, in practice, FIG. 2 may include multiple wireless stations 130, AMFs 220, UPFs 230, SMFs 240, AFs 250, UDMs 252, PCFs 254, NRFs 256, NEFs 258, and/or NSSFs 260.

Wireless station 130 may include one or more devices and other components and functionality that enable UE device 110 to wirelessly connect to access network 120 using 5G Radio Access Technology (RAT). Wireless station 130 may include, for example, a gNodeB (gNB) with a wireless transceiver with an antenna array configured for mm-wave wireless communication. In other implementation, wireless station 130 may include another type of base station that supports network slicing. Wireless station 130 may communicate with AMF 220 using an N2 interface 222 and communicate with UPF using an N3 interface 232. According to implementations described herein, wireless station 130 may receive and store network slice data which may be used for applying intelligent admission control during an initial attachment process for UE device 110.

AMF 220 may perform registration management, connection management, reachability management, mobility management, lawful intercepts, Short Message Service (SMS) transport between UE device 110 and an SMS function (not shown in FIG. 2), session management messages transport between UE device 110 and SMF 240, access authentication and authorization, location services management, functionality to support non-3GPP access networks, and/or other types of management processes. AMF 220 may be accessible by other function nodes via a Namf interface 224. In one implementation, AMF 220 may have multiple instances, where each AMF instance is associated with a particular network slice (e.g., network slice 150). According to implementations described herein, an AMF 220 may receive and forward network slice status information to wireless station 130.

UPF 230 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., wireless station 130), and/or perform other types of user plane processes. UPF 230 may communicate with SMF 240 using an N4 interface 234 and connect to IP network 201 using an N6 interface 236. According to an implementation described herein, UPF 230 may store network slice characteristics, which may be provided (e.g., via AMFs 220) to wireless stations 130 for use in implementing admission controls, based on network slice availability, during an initial attachment process for UE device 110.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate charging data collection, termination of session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

NSSF 260 may select a set of network slice instances to serve a particular UE device 110, determine network slice selection assistance information (NSSAI), determine a particular AMF 220 to serve a particular UE device 110, and/or perform other types of processes associated with network slice selection or management. NSSF 260 may be accessible via Nnssf interface 272. According to an implementation described herein, NSFF 260 may store network slice characteristics, which may be provided (e.g., via AMFs 220) to wireless stations 130 for use in selecting an alternate network slice 150 during an initial attachment process for UE device 110.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, core network 215 may include a reference point architecture that includes point-to-point interfaces between particular function nodes.

Figure 3:
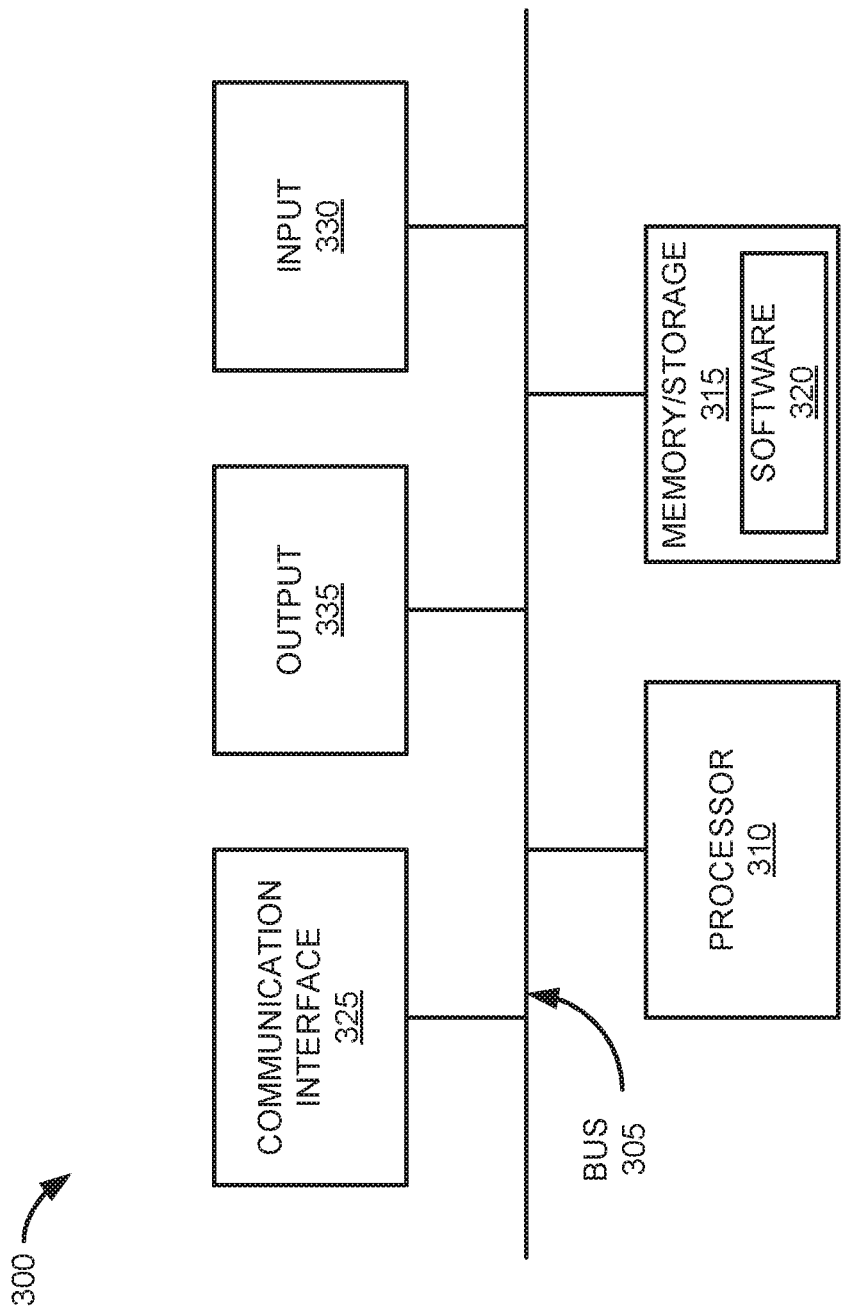
FIG. 3 is a diagram illustrating exemplary components of a device that may correspond to one or more of the devices illustrated and described herein.

FIG. 3 is a diagram illustrating example components of a device 300 according to an implementation described herein. UE device 110, wireless station 130, AMF 220, UPF 230, SMF 240, AF 250, UDM 252, PCF 254, NRF 256, NEF 258, NSSF 260, and/or other components of access network 120 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335.

According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, UE device 110 and/or wireless station 130 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
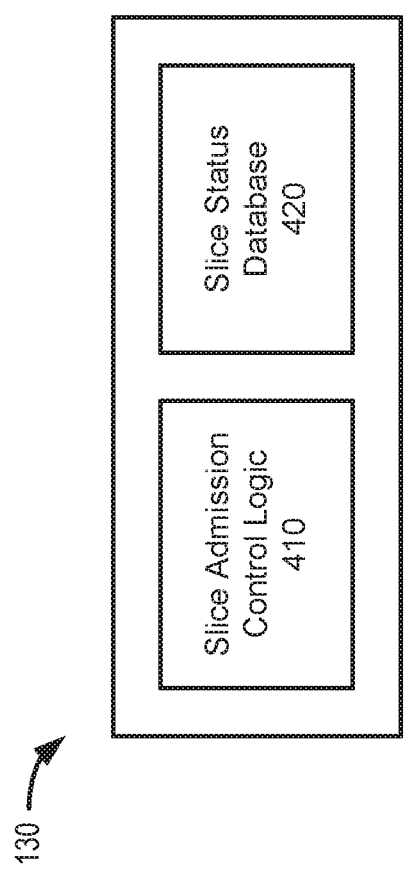
FIG. 4 is a functional block diagram of components implemented in the wireless station of FIGS. 1 and 2.

FIG. 4 is an exemplary functional block diagram of components implemented in wireless station 130. In an exemplary implementation, all or some of the components illustrated in FIG. 4 may be implemented by processor 310 executing software instructions 320 stored in memory/storage 315. As shown, wireless station 130 may include slice admission control logic 410 and a slice status database 420.

Slice admission control logic 410 may apply admission controls to determine if a UE device (e.g., UE device 110) that provides a designated NSSID may be granted access to the specific network slice. Slice admission control logic 410 may further apply a decision process to allow, block or delay access by a UE device 110. In one implementation, slice admission control logic 410 may consider the device type of UE device 110, may consider current network slice conditions, and may consider available network resources to make an intelligent decision per slice. In another implementation, slice admission control logic 410 may associate a slice with a particular device type or access class. For example, as described further herein, slice admission control logic 410 may also determine if the type of UE device 110 matches the type of traffic for which the requested network slice is configured (e.g., massive IoT, autonomous driving, video streaming, etc.). The type of UE device 110 may be indicated, for example, by an access class designation or another type of device group designation assigned to UE device 110, such as a private network identifier (e.g., a PLMN-ID).

Slice admission control logic 410 may also evaluate whether congestion exists for a specific network slice. Slice admission control logic 410 may determine if there is available radio spectrum for a requested network slice or slice admission control logic 410 may receive network slice conditions from core network 215. Slice admission control logic 410 may further track availability of other network slices (e.g., network slices not requested by UE device 110)

to determine if a request may be directed to a different network slice when there is congestion in the slice indicated in an initial registration request. In one implementation, slice admission control logic 410 may use slice status database 420 to monitor network slice conditions, characteristics, and availability.

Slice status database 420 may include a locally stored table of network slice data (e.g., slice ID database 400). Slice status database 420 may be used by slice admission control logic 410 to make determinations to allow, block, delay, or redirect a registration request for a specific network slice.

Figure 5:
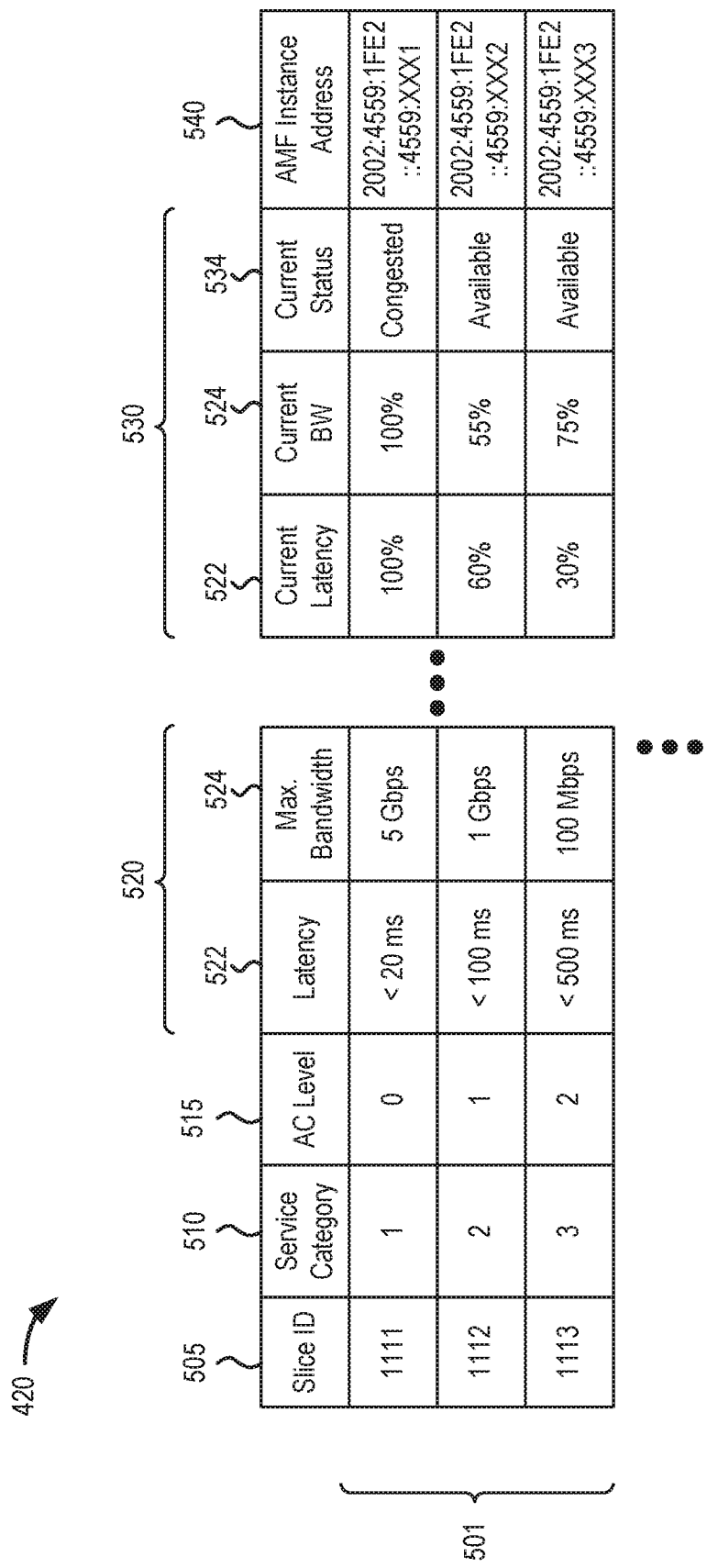
FIG. 5 is a diagram illustrating an exemplary implementation of a slice ID database.

FIG. 5 is a diagram depicting an exemplary implementation of a slice status database 420. As shown, a data structure of slice status database 420 may include multiple entries 501, with each entry 501 including a slice identifier (ID) field 505, a service category field 510, an access class (AC) level field 515, one or more slice characteristics fields 520, a slice conditions field 530, and an AMF instance address field 540. Slice status database 420 may be stored locally in wireless station 130 (e.g., in memory 315). In one implementation, slice status database 420 may be updated dynamically by each wireless station 130.

Slice ID field 505 may store an identifier for a network slice 150. The unique identifier includes a single identifier associated with the network slice. In one implementation, the unique ID stored in field 505 may correspond to an NSSID. In another implementation, the unique ID stored in field 505 may correspond to an IP address for an AMF instance (AMF 220) that supports the network slice. That is, each AMF 220 instance may be associated with a unique network slice 150. In another implementation, the identifier for the network slice 150 may be a string (e.g., numerical, alpha-numerical, etc.) different from the NSSID or the IP address of the AMF instance.

Service category field 510 may include a unique identifier (e.g., 1, 2, 3, etc.) for a service category associated with a type of communication initiated by UE device 110. Each service category in service category field 510 may relate to a different type of communication. For example, service category "1" may be associated with medical data (e.g., medical monitoring), category "2" may be associated with one type of MTC (e.g., autonomous vehicle data), category "3" may be associated with a different type of MTC (e.g., utilities metering), etc.

AC level field 515 may provide an indication of whether communications for a particular service category are subject to admissions control and/or different priority levels for admission controls. Where applicable, admission control levels may include, for example, no admission control (e.g., "0"), and a range from a highest priority communication that is subject to admission control (e.g., "1") to a lowest priority communication that is subject to admission control (e.g., "4") based on the nature of the communications traffic in a service category.

Slice characteristics fields 520 may include provisioned characteristics or features of a particular network slice associated with the slice ID in slice ID field 505. Examples of slice characteristics fields 520 include a latency field 522 and a bandwidth field 524. Latency field 522 may store a particular latency value associated with the particular network slice for the particular slice ID. The latency value may reflect, for example, a maximum end-to-end latency configured for the corresponding network slice. Bandwidth field 524 may represent the total bandwidth supported by a particular network slice associated with a slice ID in slice ID field 505. Bandwidth field 524 may reflect, for example, a maximum bandwidth associated with a limiting link in the network slice. In other implementations, bandwidth field 524 may include separate uplink and downlink bandwidth values.

Slice conditions field 530 may include a real-time (or near-real-time, such as within half a second of a status change) indication of whether a network slice for a particular entry 501 is congested and can be assigned to a UE device 110. Examples of slice conditions fields 530 include a current latency field 532, a current bandwidth field 534, and a current status field 536. Current latency field 532 may indicate an average slice latency (e.g., an end-to-end latency) for a current time interval. Entries in current latency field 532 may include a numerical value or percentage relative to a corresponding value in latency field 522. Current bandwidth field 534 may indicate an available bandwidth or capacity for a network slice. Entries in current bandwidth field 534 may include a numerical value or percentage relative to a corresponding value in bandwidth field 524. Current status field 536 may provide an availability indication based on one or more current slice conditions. For example, congested network conditions may temporarily preclude assignment of one or more network slices. A congested status in current status field 536 may be determined, for example, by wireless station 130 or one or more network devices 145.

AMF address field 540 may include an IP address for a specific AMF instance associated with an entry 501. The address in AMF address field 540 may be used, for example, by wireless station 130 to initiate a connection requested by a UE device 110. In another implementation, a Globally Unique AMF ID (GUAMI) or a different type of identifier may be used in AMF address field 540.

Slice ID database 420 is depicted in FIG. 5 as including a tabular data structure with a certain number of fields having certain content. The tabular data structure of slice ID database 420 shown in FIG. 5, however, is for illustrative purposes. Other types of data structures may alternatively be used. The number, types, and content of the entries and/or fields in the data structure of slice ID database 420 are also for illustrative purposes. Other data structures having different numbers of entries, different types of and/or content in the entries, and/or different fields may be implemented. Therefore, slice ID database 420 may include additional, fewer and/or different entries and/or fields than those depicted in FIG. 5.

Figure 6A:
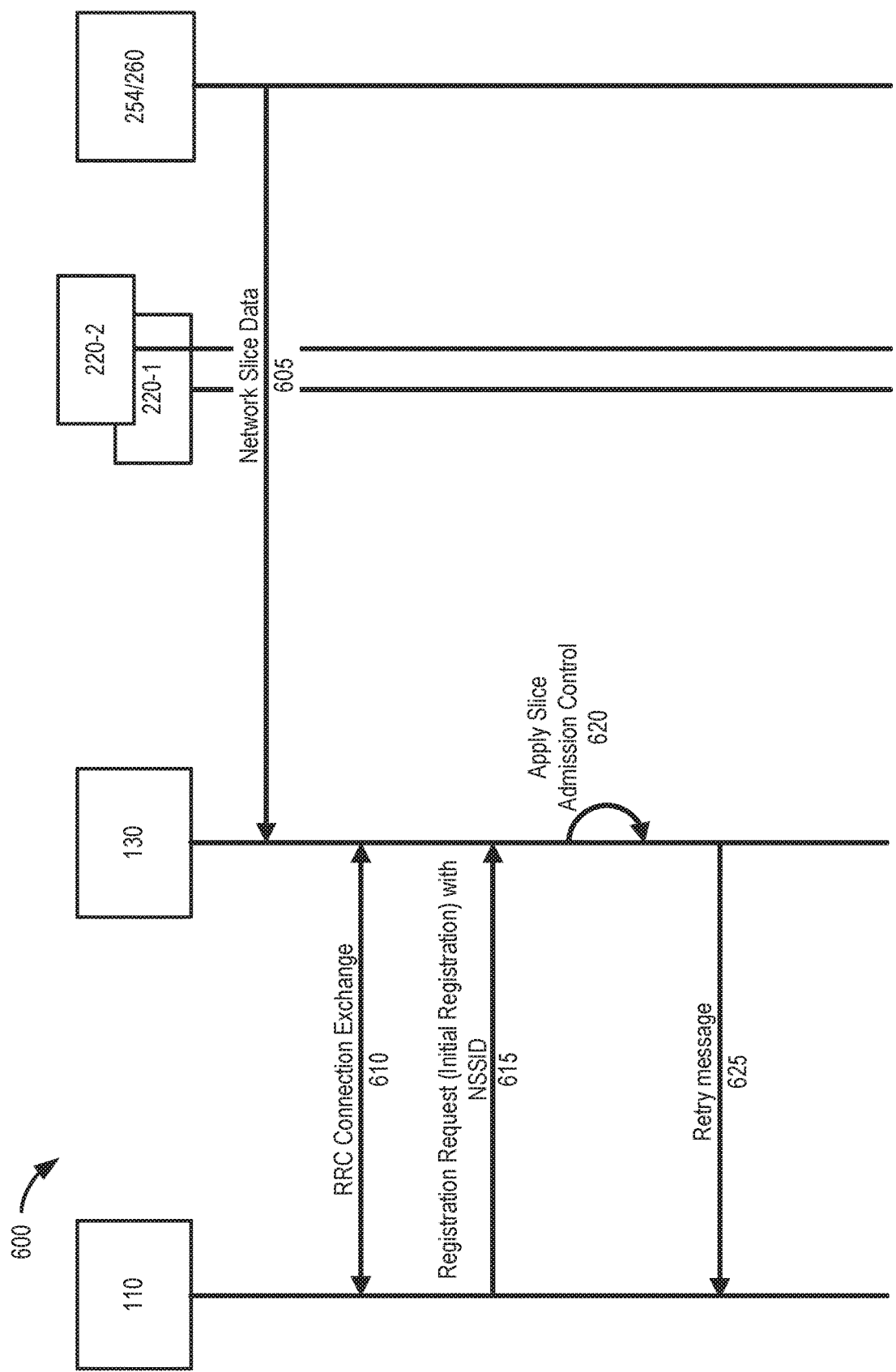

FIGS. 6A and 6B are diagrams illustrating exemplary communications for network slice identification and selection in a portion 600 of network environment 200. More specifically, FIG. 6A is a diagram illustrating an exemplary admission control process by wireless station 130 where a registration request from UE device 110 is blocked or delayed. FIG. 6B is a diagram illustrating an exemplary admission control process by wireless station 130 where a registration request from UE device 110 is redirected. Network portion 600 may include UE device 110, wireless station 130, AMFs 220-1 and 220-1, and PCF 254/NSSF 260. According to one implementation, AMF 220-1 may be associated with a first network slice/NSSID, and AMF 220-2 may be selected with a second (different) network slice/NSSID. Communications shown in FIGS. 6A and 6B provide simplified illustrations of communications in network portion 600 and are not intended to reflect every signal or communication exchanged between devices.

Referring to FIG. 6A, network slice data 605 may be provided to wireless station 130. Network slice data 605 may include, for example, data used to compile slice ID database 420, such as a slice ID, service category, access class level, slice characteristics, slice status, and an AMF instance address for each network slice available via a particular wireless station 130. According to implementations described herein, network slice data 605 may be provided to wireless station 130 on a continuously updated (e.g. dynamic) basis to reflect current network conditions. In one implementation, different network slice data 605 may be provided from PCF 254 or NSSF 260 (e.g., via an AMF 220 or UPF 230) to different wireless stations 130. That is, network slice data 605 for one wireless station 130 may be different than network slice data 605 for another wireless station 130.

Assume subsequent to a power-up procedure of UE device 110, UE device 110 and wireless station 130 perform a radio resource control (RRC) connection exchange 610. For example, UE device 110 may generate an RRC Connection Request message via a control channel and, in response, wireless station 130 may respond with an RRC Connection Setup message. Wireless station 130 may transmits the RRC Connection Setup message to UE device 110 via the control channel.

As part of or subsequent to RRC connection exchange 610, UE device 110 may generate and transmit a registration request message 615. When registration request message 615 is provided in the context of an initial registration, UE device 110 may include an information element (IE) with an NSSID for a specific network slice previously assigned for UE device 110. For example, if UE device 110 may be a dedicated function device (e.g., massive IoT device, autonomous vehicle device, monitoring device, streaming device, etc.) that is assigned to a particular service category, which is serviced via a particular network slice.

Wireless station 130 may receive registration request message 615 (including the NSSID) from UE device 110 and apply slice admission control, as indicated by reference 620. For example, wireless station 130 may reference slice status database 420 to determine, based on current network conditions, whether UE device 110 can access the network slice corresponding to the NSSID (e.g., one of network slices 150). Wireless station 130 may determine, for example, that UE device 110 may be admitted, blocked from the slice, delayed access to the slice, or redirected to a different slice.

In the example of FIG. 6A, assume that wireless station 130 determines to delay UE device 110 from accessing the slice corresponding to the NSSID in registration request message 615. In response to registration request message 615, wireless station 130 may send a retry message 625 with a back-off period. The back-off period may be determined, for example, by wireless station 130 based on a congestion level (e.g., indicated in slice status database 420), a service class associated with the network slice, or from a value (not shown) in slice status database 420. Thus, UE device 110 may be delayed from accessing core network 215 without a separate communication exchange between wireless station 130 and core network 215.

Referring to FIG. 6B, communications 605, 610, and 615 may be similar to those described above in connection with FIG. 6A. Upon receiving registration request message 615 (including an NSSID) from UE device 110, wireless station 130 may apply slice admission control, as indicated by reference 620, to determine if UE device 110 may be admitted, blocked from the slice, delayed access to the slice, or redirected to a different slice. In the example of FIG. 6B, assume that the NSSID of registration request message 615 associated with AMF 220-1 and that wireless station 130 determines to redirect UE device 110 to another available slice serviced by AMF 220-2. For example, wireless station 130 may determine that the originally-requested slice serviced by AMF 220-1 is congested, but other network slices are available that can meet the service requirements of UE device 110 (e.g., another network slice is configured with service levels equal to or higher than the configured service levels of the requested network slice). In one implementation, wireless station 130 may use slice characteristics from a locally stored table of network slice data (e.g., slice status database 420), to select an appropriate alternate slice ID.

As further shown in FIG. 6B, wireless station 130 may forward an Initial UE Message 645 to the AMF 220-2 associated with the selected alternate slice ID. Using slice status database 420, for example, wireless station 130 may identify an IP address for the appropriate AMF 220 (e.g., AMF 220-2) that corresponds to the alternate slice ID. In one implementation, AMF 220-2 may confirm (e.g., with one or more other core network elements, such as UPF 230, PCF 254, or NSSF 260), that the user plane of the selected network slice can support communications for UE device 110. In another implementation, wireless station 130's selection of an entry 501 from slice status database 420 (e.g., field 534) may serve as initial confirmation that the selected network slice can support communications for UE device 110. In response to receiving Initial UE Message 645, AMF 220-2 may conduct exchanges with UE device 110 for UE authentication and non-access stratum (NAS) security initiation, as indicated by reference 650.

Figure 7:
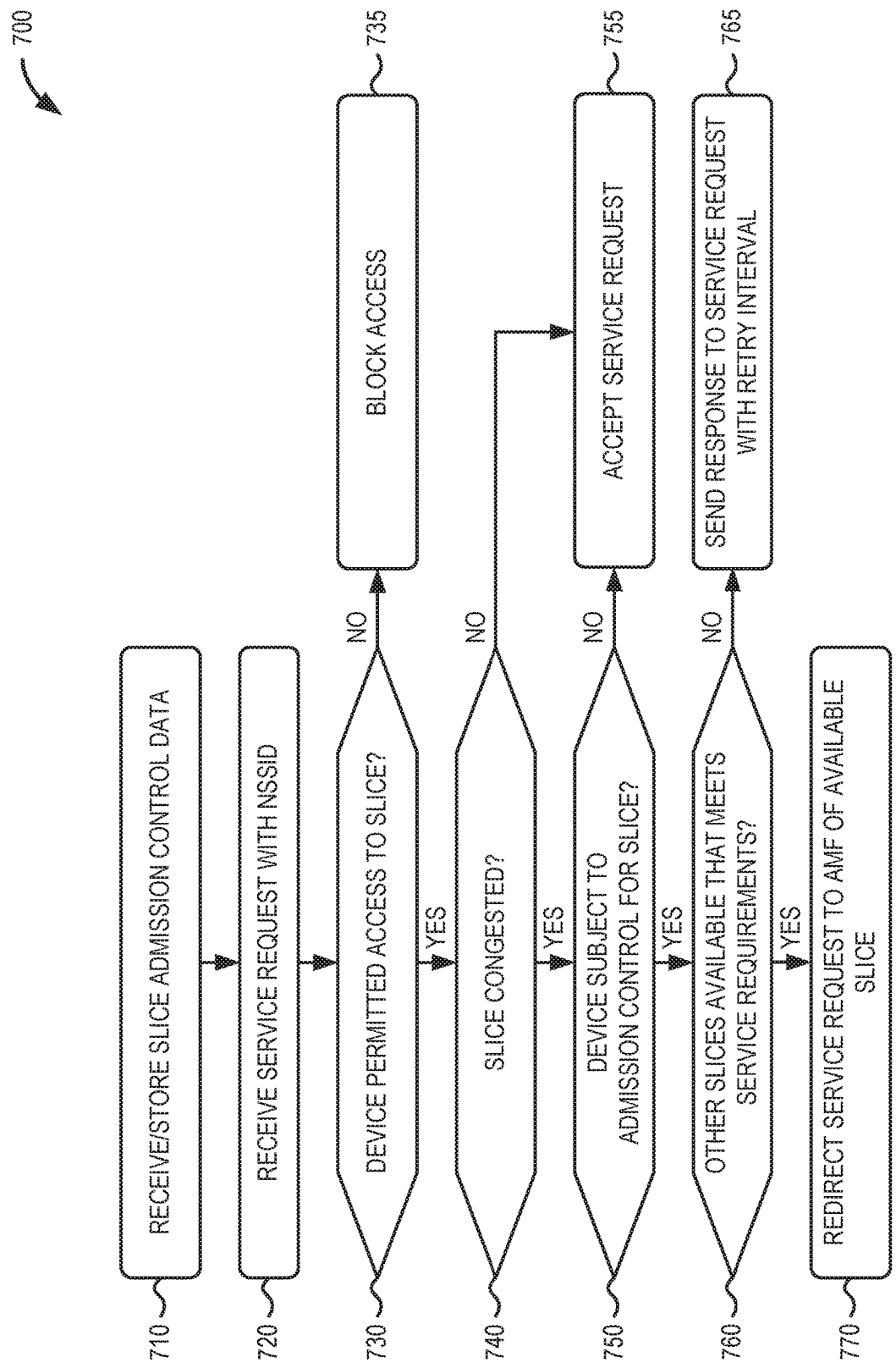
FIG. 7 is a flow diagram illustrating an exemplary process for applying admission control at a wireless station, according to implementations described herein.

FIG. 7 is a flow diagram illustrating an exemplary process 700 for applying admission control at a wireless station, according to an implementation described herein. In one implementation, process 700 may be implemented by wireless station 130. In another implementation, process 700 may be implemented by wireless station 130 in conjunction with one or more other devices in network environment 200.

Referring to FIG. 7, process 700 may include receiving and storing slice admission control data (block 710). For example, wireless station 130 may receive, network slice data (e.g., network slice data 605 of FIGS. 6A and 6B) from core network 215 (e.g., AMF 220 and/or PCF 254) for each network slice available through wireless station 130. The network slice data may include, for each network slice, a unique slice ID, a service category, corresponding slice characteristics, and current status data. In some implementations, the network slice data may also include an IP address for each corresponding AMF instance servicing a corresponding network slice. The slice data may be stored in a local database of wireless station 130 (e.g., slice status database 420).

Process 700 may further include receiving a service request with an NSSID (block 720) and determining if the device is permitted to access the slice associated with the NSSID (block 730). For example, wireless station 130 may receive a registration request message (e.g., registration request message 615) from UE device 110 that indicates network slice ID previously assigned to UE device 110. The network slice ID may be an NSSID or another requested network slice selection assistance information R-NSSAI parameter. Using, for example, slice status database 420, wireless station 130 may attempt to match the requested network slice ID with characteristics and current status data of the corresponding network slice.

If the device is not permitted to access the slice associated with the NSSID (block 730—No), process 700 may include blocking access to the network slice (block 735). For example, wireless station 130 may determine that the device type of UE device 110 does not correspond to the allowed device type for the requested network slice. Accordingly, wireless station 130 may block access to the network slice. In one implementation, UE device 110 may need to be reconfigured to request a different network slice going forward.

If the device is permitted to access the slice associated with the NSSID (block 730—No), process 700 may include determining if the slice is congested (block 740). For example, wireless station 130 may use slice status database 420 to identify if a network slice corresponding to the network slice ID of registration request message 615 is congested so as to preclude additional traffic.

If the requested slice is congested (block 740—Yes), process 700 may include determining if the device is subject to admission controls for the slice (block 750). For example, wireless station 130 may use slice status database 420 to identify if admission controls are applicable to devices requesting a network slice corresponding to the network slice ID of registration request message 615.

If the requested slice is not congested (block 740—No) or if the device is subject to admission controls for the slice (block 750—No), process 700 may include accepting the service request for the requested network slice (block 755). For example, wireless station 130 may forward the registration request message to an AMF 220 corresponding to the network slice ID of registration request message 615.

If the device is subject to admission controls for the slice (block 750—Yes), process 700 may include determining if another slice is available that meets the service requirements of the UE device (block 760). For example, if the requested network slice is unavailable, wireless station 130 may use slice status database 420 to determine if another network slice is available and has characteristics that could support UE device 110. In one implementation, wireless station 130 may identify an alternate network slice with characteristics that that equal or exceed characteristics of the requested network slice (e.g., characteristics for minimum latency, bandwidth, etc.).

If another slice that meets the service requirements of the UE device is not available (block 760—No), process 700 may include sending a response to the service request with a retry interval (block 765). For example, wireless station 130 may send a retry message 625 with a back-off period. According to one implementation, wireless station 130 may calculate the back-off period based on the service category associated with the network slice ID (e.g., in slice database 420) and the network slice capacity.

If another slice is available that meets the service requirements of the UE device (block 760—Yes), process 700 may include redirecting the service request to an AMF for the available slice (block 770). For example, wireless station 130 may forward the registration request message (e.g., initial UE message 645) to an AMF 220 (e.g., AMF 220-2) corresponding to the alternate network slice ID.

Systems and methods described herein provide admission controls at wireless stations based on network slice identifiers provided during an initial connection. A wireless station receives, from a core network, network slice data for each network slice available via the wireless station, wherein the network slice data includes a slice identifier and corresponding slice status for each network slice; and receives, from a user equipment (UE) device, a service request that indicates a network slice identifier previously assigned to the UE device. The wireless station applies, based on the network slice data from the core network and the network slice identifier from the UE device, admission controls to forward the service request to the core network when the one of the network slices, corresponding to the network slice identifier, is not congested, and delay or redirect the service request when the one of the network slices, corresponding to the network slice identifier, is congested.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A wireless station, comprising:
a first communications interface for sending or receiving data using a wireless access network;
a second communications interface for exchanging data with a core network; and
one or more processors configured to:
receive, from the core network via the second communications interface, network slice data for each network slice available via the wireless station, wherein the network slice data includes a slice identifier and a corresponding slice congestion status for each network slice,
store the network slice data in a memory to form stored network slice data,
receive, from a user equipment (UE) device via the first communication interface, a service request that indicates a network slice identifier previously assigned to the UE device,
determine, based on the stored network slice data, whether admission controls are applicable to the network slice identifier,
when the admission controls are applicable to the network slice identifier, determine, based on the stored network slice data and the network slice identifier from the UE device, whether one of the network slices, corresponding to the network slice identifier, is congested, and
apply admission controls to:
forward the service request to the core network when the one of the network slices, corresponding to the network slice identifier, is not congested,
redirect the service request to an alternate network slice when the one of the network slices, corresponding to the network slice identifier, is congested and the alternate network slice is available from the stored network slice data, and
delay the service request when the one of the network slices, corresponding to the network slice identifier, is congested and no alternate network slice is available from the stored network slice data.

2. The wireless station of claim 1, wherein, when forwarding the service request to the core network, the one or more processors are further configured to:
send, to an Access and Mobility Management Function (AMF) instance associated with the slice identifier, a message to establish a connection.

3. The wireless station of claim 1, wherein the network slice data further includes:
a service category associated with each of the network slice identifiers, and
an internet protocol (IP) address for an Access and Mobility Management Function (AMF) instance associated with each slice identifier.

4. The wireless station of claim 1, wherein the stored network slice data includes an access class (AC) level for each of the network slices.

5. The wireless station of claim 1, wherein the one or more processors are further configured to:
receive updated network slice data for one or more of the network slices available via the wireless station, wherein the updated network slice data includes a real-time update of the corresponding slice congestion status, and
update the stored network slice data.

6. The wireless station of claim 1, wherein the stored network slice data includes one or more of a current latency value or a current bandwidth value for each of the network slices.

7. The wireless station of claim 1, wherein, when applying the admission controls to redirect, the processor is further configured to:
identify, from the stored network slice data, the alternate network slice with configured service levels equal to or higher than configured service levels of the one of the network slices corresponding to the network slice identifier, and
send, to an Access and Mobility Management Function (AMF) instance associated with the alternate network slice, an initial message to establish a connection.

8. The wireless station of claim 1, wherein, when applying the admission controls to delay, the one or more processors are further configured to:
determine a back-off interval for the UE device, and
send, to the UE device, a retry message including the back-off interval.

9. A method, comprising:
receiving, by a wireless station for a radio access network (RAN) and from a core network, network slice data for each network slice available via the wireless station, wherein the network slice data includes a slice identifier and a corresponding slice congestion status for each network slice, storing, by the wireless station, the network slice data in a memory to form stored network slice data, receiving, by the wireless station and from a user equipment (UE) device, a service request that indicates a network slice identifier previously assigned to the UE device, determining, by the wireless station and based on the stored network slice data, whether admission controls are applicable to the network slice identifier, when the admission controls are applicable to the network slice identifier, determining, by the wireless station and based on the stored network slice data from the core network and the network slice identifier from the UE device, whether one of the network slices, corresponding to the network slice identifier, is congested, and applying, by the wireless station, admission controls to:
forward the service request to the core network when the one of the network slices, corresponding to the network slice identifier, is not congested,
redirect the service request to an alternate network slice when the one of the network slices, corresponding to the network slice identifier, is congested and the alternate network slice is available from the stored network slice data, and
delay the service request when the one of the network slices, corresponding to the network slice identifier, is congested and no alternate network slice is available from the stored network slice data.

10. The method of claim 9, wherein forwarding the service request to the core network further comprises:
send, to an Access and Mobility Management Function (AMF) instance associated with the slice identifier, a message to establish a connection between the UE device and the core network.

11. The method of claim 9, wherein the network slice data further includes a service category associated with each of the network slice identifiers.

12. The method of claim 9, the stored network slice data includes an access class (AC) level for each of the network slices.

13. The method of claim 9, further comprising:
receiving, after receiving the service request, updated network slice data for one or more of the network slices available via the wireless station.

14. The method of claim 9, further comprising:
receiving updated network slice data for one or more of the network slices available via the wireless station, wherein the updated network slice data includes one or more of a current latency value or a current bandwidth value for each of the network slices, and
updating the stored network slice data with the updated network slice data.

15. The method of claim 9, wherein applying the admission controls to redirect further comprises:
identifying, from the stored network slice data, the alternate network slice with configured service levels equal to or higher than configured service levels of the one of the network slices corresponding to the network slice identifier, and
sending, to an Access and Mobility Management Function (AMF) instance associated with the alternate network slice, an initial message to establish a connection.

16. The method of claim 9, wherein applying the admission controls to delay further comprises:
determining a back-off interval for the UE device, and
sending, to the UE device, a retry message including the back-off interval.

17. The method of claim 9, wherein the wireless station includes a gNodeB for a New Radio network.

18. A non-transitory, computer-readable storage media storing instructions executable by one or more processors of one or more devices, which when executed cause the one or more devices to:
receive, from a core network via a first communications interface, network slice data for each network slice available via a wireless station, wherein the network slice data includes a slice identifier and a corresponding slice congestion status for each network slice,
store the network slice data in a memory to form stored network slice data,
receive, from a user equipment (UE) device via a second communication interface, a service request that indicates a network slice identifier previously assigned to the UE device,
determine, based on the stored network slice data, whether admission controls are applicable to the network slice identifier,
when the admission controls are applicable to the network slice identifier, determine, based on the stored network slice data and the network slice identifier from the UE device, whether one of the network slices, corresponding to the network slice identifier, is congested, and
apply admission controls to:
forward the service request to the core network when the one of the network slices, corresponding to the network slice identifier, is not congested,
redirect the service request to an alternate network slice when the one of the network slices, corresponding to the network slice identifier, is congested and the alternate network slice is available from the stored network slice data, and
delay the service request when the one of the network slices, corresponding to the network slice identifier, is congested and no alternate network slice is available from the stored network slice data.

19. The non-transitory, computer-readable storage media of claim 18, wherein the stored network slice data includes an access class (AC) level for each of the network slices.

20. The non-transitory, computer-readable storage media of claim 19, further comprising instructions to:
update the stored network slice data to reflect current latency values or current bandwidth values for each network slice.

* * * * *